US007043059B2

(12) United States Patent
Cheatle et al.

(10) Patent No.: US 7,043,059 B2
(45) Date of Patent: May 9, 2006

(54) METHOD OF SELECTIVELY STORING DIGITAL IMAGES

(75) Inventors: Stephen Philip Cheatle, Bristol (GB); David Arthur Grosvenor, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 739 days.

(21) Appl. No.: 10/042,997

(22) Filed: Jan. 9, 2002

(65) Prior Publication Data

US 2002/0110286 A1 Aug. 15, 2002

(30) Foreign Application Priority Data

Feb. 10, 2001 (GB) ................................. 0103362.0

(51) Int. Cl.
*G06K 9/00* (2006.01)

(52) U.S. Cl. ..................... 382/112; 382/103; 348/142
(58) Field of Classification Search ............. 382/103, 382/305, 112, 171, 105, 118, 124–127; 348/143, 348/161, 153–155, 169
See application file for complete search history.

(56) References Cited

U.S. PATENT DOCUMENTS

| 5,440,343 | A | * | 8/1995 | Parulski et al. | ............. 348/316 |
| 5,912,980 | A | * | 6/1999 | Hunke | ........................ 382/103 |
| 6,118,887 | A | * | 9/2000 | Cosatto et al. | ............. 382/103 |
| 6,205,231 | B1 | * | 3/2001 | Isadore-Barreca et al. | .. 382/103 |
| 6,396,963 | B1 | * | 5/2002 | Shaffer et al. | ............. 382/305 |

FOREIGN PATENT DOCUMENTS

| GB | 2352919 A | | 2/2001 |
| GB | 2370438 A | | 6/2002 |
| JP | 10-304231 | * | 11/1998 |
| JP | 11136557 | | 5/1999 |

\* cited by examiner

*Primary Examiner*—Kanjibhai Patel
*Assistant Examiner*—Sath V. Perungavoor
(74) *Attorney, Agent, or Firm*—Thomas, Kayden, Horstemeyer & Risley, LLP

(57) ABSTRACT

Briefly described, one embodiment is a method comprising storing, in the memory, a plurality of digital images received from the source, each image representing an event captured at a different respective time, using the processor to perform an analysis of the images, assigning a quality factor to each image, the quality factor being representative of the composition quality of the analysed images, and updating the memory to maintain images for which the assigned quality factor indicates a higher composition quality than an image captured at an earlier time.

26 Claims, 3 Drawing Sheets

METHOD OF SELECTIVELY STORING DIGITAL IMAGES

CLAIM TO PRIORITY

This application claims priority to copending United Kingdom utility application entitled, "A METHOD OF SELECTIVELY STORING DIGITAL IMAGES," having serial no. GB0103362.0, filed Feb. 10, 2001, which is entirely incorporated herein by reference.

TECHNICAL FIELD

This invention relates to a method of selectively storing digital images.

BACKGROUND

When taking still photographs, a photographer needs to select a particular instant in time in which to capture an image. Whether or not the image will be pleasing to the eye, however, will depend on the photographers ability to recognize good photographic composition and to anticipate the time when the photograph should be taken to capture such composition. The photographic composition task is not trivial and involves conscious anticipation of action and movement of the photographer in order to compare alternative viewpoints.

Generally speaking, the average person taking a photograph will not want to spend time considering composition factors, the end result being that many memorable events go un-recorded or poorly-recorded. One way in which this problem is reduced in film-based cameras is to provide a motor-drive mechanism which automatically winds-on the camera film to allow photographs to be taken at the highest rate possible. Of course, such film-based cameras (being bulky and mainly mechanical in their film-winding structure) are limited in terms of the rate at which photographs can be taken and ultimately produce a large number of photographs which are of no use or interest to the photographer. Digital cameras, which are being increasingly used, are able to capture photographic images at a faster rate than their non-digital counterparts. Thus, a user is able to select the better images, from a compositional point of view, from the large number of total images captured and stored. However, such cameras still suffer from the disadvantage that a large number of captured images will be of no use or interest to the photographer. Since such cameras have a limited memory capacity, such unwanted images take up significant amounts of storage space and so frequent 'clearing-out' operations have to be performed, as well as post-editing to sort out the good-photos from the bad (and thus still requiring the user to have some appreciation of composition).

SUMMARY

According to a first aspect of the present invention, there is provided a method of selectively storing digital images, the method comprising: storing, in a memory, a plurality of digital images received from a source, each image representing an event captured at a different respective time; using a processing means to perform an analysis of the image content; assigning a quality factor to each image, the quality factor being representative of the composition quality of the analyzed image content; and updating the memory to maintain images for which the assigned quality factor indicates a higher composition quality than an image captured at an earlier time.

Thus, by using the processing means to analyze and assign a quality factor to each image, based on composition quality, the memory of the device in question can be maintained so as to store only those images which are indicated as being better (from a compositional point of view) than earlier-captured images. Accordingly, memory space, be it in a computer or in a digital camera, is better utilized For example, in the method, first and second images may be stored, the second image being captured after the first image, the step of updating the memory comprising deleting the first image if its assigned quality factor indicates a lower composition quality than that assigned to the second image. The user is not required to have any real knowledge of composition considerations.

In the context of the present specification, "composition quality" relates to measures of the disposition of elements within a photographic composition, disposition covering any or all of orientation of the element itself, position or orientation relative to other elements of the composition, and position or orientation relative to the composition as a whole. It does not relate to optimization of the image, as opposed to the composition (such as, for example, by sharpening focus or removing artifacts arising from the image capture apparatus).

The step of analyzing the image content may comprise identifying groups of images having similar content by means of comparing the content of an image acquired at a time t1 with the content of images captured prior to t1, the step of updating the memory being performed separately for each identified group of images having similar content. In this way, images representing differing viewpoints of a particular scene may be grouped together, with the step of updating the memory being performed for each group. The end result, therefore, should provide a number of image groups, with an image being stored for each group having good composition compared with others in that group. In the step of analyzing the image content, the content of the image to be compared may be established by means of (i) identifying one or more area(s) of interest in the image, and (ii) tracking the motion of the area(s) of interest over subsequent images.

The step of identifying area(s) of interest may comprise segmenting the image into regions having generally consistent texture and/or color.

The step of analyzing the image content may further comprise identifying at least one subject area of interest, and wherein, in the step of assigning a quality factor to each image, the quality factor is representative of the composition quality of the subject area(s) of interest. In this sense, the subject area of interest will usually be the intended subject of the photograph, e.g., a person, animal, or object. In the step of identifying the subject area(s) of interest, the subject area(s) of interest might be assumed to be generally located in the center of the image.

In the step of identifying the subject area(s) of interest, human facial features may be identified as comprising the subject area(s) of interest.

The quality factor may be determined according to the size of the subject area(s) of interest, the composition quality increasing with the size of the subject area(s) of interest. Alternatively, the quality factor can be determined according to the spatial separation of the subject area(s) of interest with respect to other parts of the image having a high relative motion, the composition quality increasing with the amount of spatial separation. As a further option, the quality factor may be determined according to the presence of area(s) of interest at the edges of the image, the composition quality decreasing in the presence of such area(s) of interest at the image edges.

In the case where the subject area(s) of interest are facial features, the quality factor may be determined according to the presence of area(s) of interest obscuring the identified facial subject area(s) of interest, the composition quality decreasing according to the degree that the facial subject area(s) is/are obscured. Further, the quality factor may be determined according to the orientation of the identified facial subject area(s) of interest, the composition quality increasing if (a) there is at least one identified facial subject area where most or all of the face is visible in the image and/or (b) there are two identified facial subject areas whose orientations face one another. Taking this a stage further, the quality factor might be determined according to recognition of facial subject area(s) of interest, the composition quality increasing if there is a facial subject area in the image which is identified as being present in a database of previously-stored facial features.

The above-described methods of determining the quality factor of an image are by no means exclusive to one another. Indeed, more sophisticated algorithms may be devised to judge the composition quality of an image based on a combination of the above methods or by using further methods.

In one embodiment of the invention, in the step of storing images received from a source, the images are divided into first and second groups, the first group comprising images received at a first data rate and a first resolution, and the second group comprising images received at a second data rate and a second resolution, the second data rate being greater than that of the first data rate, and the second resolution being less than that of the first resolution, and wherein, in the step of analyzing the image content, the content of the image to be compared is established by means of tracking the motion of the area(s) of interest using images of the second group, the resulting quality factor being assigned to a preceding image of the first group. This effectively provides a situation where so-called "key-frames" (forming the first group of images and having a relatively high-resolution) are acquired. Preferably, between each acquired key-frame, images in the second group are acquired at a higher data rate and with a lower resolution. Motion tracking may therefore be performed more efficiently and effectively on the high data rate images to produce a quality factor which can be assigned to the preceding high resolution image. Thus, the low resolution images may be discarded and the updating step performed on the high resolution images only.

The processing operation may be performed in-situ e.g., within a camera, or as a post-processing operation by means of downloading the contents of a camera memory to a computer system, the analysis and/or updating operations being performed by the computer system.

In accordance with a second aspect of the present invention, there is provided a computer program stored on a computer usable medium, the program comprising computer readable instructions for causing a computer to execute the steps of: storing, in a memory, a plurality of digital images received from a source, each image representing an event captured at a different respective time; using a processing means to perform an analysis of the image content; assigning a quality factor to each image, the quality factor being representative of the composition quality of the analyzed image content; and updating the memory to maintain images for which the assigned quality factor indicates a higher composition quality than an image captured at an earlier time.

In accordance with a third aspect of the present invention, there is provided a system for selectively storing digital images, the system comprising: a processor; a memory; and a video input port, the processor being arranged to store, in the memory, a plurality of digital images received from a source by means of the video input port, each image representing an event captured at a different respective time, the processing means being arranged to perform an analysis of the image content and to assign a quality factor to each image, the quality factor being representative of the composition quality of the analyzed image content, the processor being further arranged to update the memory to maintain images for which the assigned quality factor indicates a higher composition quality than an image captured at an earlier time.

The system may comprise a computer system.

The system could be provided as an integral part of a digital camera, be it a still camera or a combined still/video camera. Accordingly, in a fourth aspect of the present invention, there is provided a camera system for selectively storing digital images, the camera system comprising: a processor; a memory; and an image capture system, the processor being arranged to store, in the memory, a plurality of digital images received from the image capture system, each image representing an event captured at a different respective time, the processing means being arranged to perform an analysis of the image content and to assign a quality factor to each image, the quality factor being representative of the composition quality of the analyzed image content, the processor being further arranged to update the memory to maintain images for which the assigned quality factor indicates a higher composition quality than an image captured at an earlier time.

BRIEF DESCRIPTION OF THE DRAWINGS

The invention will now be described, by way of example, with reference to the accompanying drawings, in which.

DETAILED DESCRIPTION

Figure 1:
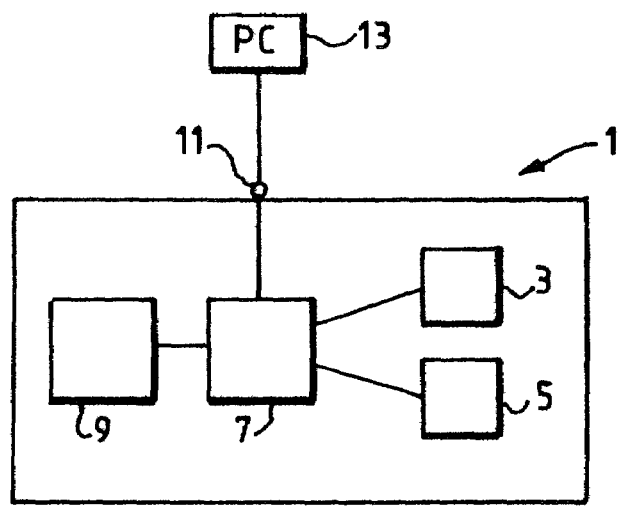
FIG. 1 is a block diagram representing the elements of a camera system.

Referring to the drawings, FIG. 1 shows a camera 1 which effectively comprises two separate camera systems 3, 5. The first camera system 3 is a high resolution camera which captures images at a rate of approximately one frame per second. The second camera system 5 is able to capture images at a faster rate, but at a lower resolution. The two camera systems 3, 5 capture images via a single lens system (not shown). Data representing the captured image frames is passed to a processor 7 and stored in a memory 9, which may be in the form of a microchip storage device, or a removable device such as a memory card or floppy disk. A data port 11 is also provided for transferring the image data to a personal computer (PC) 13.

In use, the camera may be operated in first or second modes. In the first mode, the camera operates as a conventional still camera. In the second mode, the camera operates in a so-called 'continuous capture' mode. In this latter mode, the two camera systems operate together to produce two different sets of frames, i.e., a set of high resolution frames (hereinafter referred to as 'key frames') from the first camera, interleaved by a number of low resolution frames (hereinafter referred to as 'video frames') from the second camera. The number of video frames being captured between each key frame will obviously depend on the relative capture rate of the two camera systems.

Figure 2:
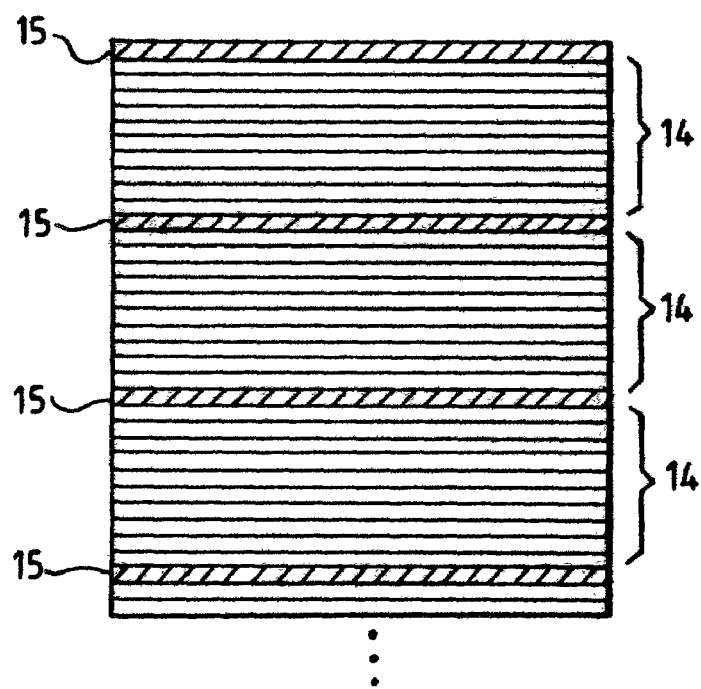
FIG. 2 illustrates the arrangement of a number of frames captured by the camera system shown in FIG. 1.

FIG. 2 represents an example set of frames captured in the continuous capture mode. In this example, ten video frames (represented by reference numeral 14) are captured between every adjacent pair of key frames (represented by reference numeral 15). The image data representing the 14, 15 frames illustrated in FIG. 2 are transferred to the PC by means of the video port 11.

The PC 13 includes an application program for performing an analysis and memory update operation of the image data received from the camera 1. The operation of this application program will be described in detail below. However, it should be understood that the operation of the application program need not be performed remotely from the camera 1. Indeed, the program could be stored and executed in a non-volatile memory within the camera 1.

The main purpose of the application program is to decide which of the captured key frames 15 should be stored, and which should be discarded (i.e., by a deletion or replacement operation) thereby freeing-up memory. This is performed by means of the application program performing an analysis of the image content, assigning a quality factor to the image content based on the composition quality of the image content, and updating the memory to remove key frames 15 which have a quality factor indicating a lower composition quality than a subsequently captured key frame. Thus, only those key frames 15 having 'interesting' content will be saved, and those key frames which are poor in terms of their content or composition will not occupy memory if a better key frame is identified.

As will be understood from the above, in this example, the selection process is performed only for the high-resolution key frames 15. The video frames 14 are used for identifying so-called 'regions of interest' in each image by tracking the relative motion of different regions having consistent color and texture. It will be appreciated that motion tracking can be performed particularly efficiently with frames captured at a higher rate. It should also be appreciated that there are other conventional techniques for identifying regions of interest.

As will be discussed below, the application program is further configured to recognize different 'groups' of images having similar or comparable content. The updating operation may thereafter be performed in respect of each identified group, rather than on the whole set of key frames 15 acquired. Thus, if the user is pointing the camera 1 at a particular subject, then turns away to look at something completely different, then the update operation will be performed separately for the two different 'scenes' or groups. If the user points the camera 1 back to the original scene, the program should recognize that the new image key frame 15 is related to the original group of image key frames 15, and so the update operation will continue for that group.

Figure 3:
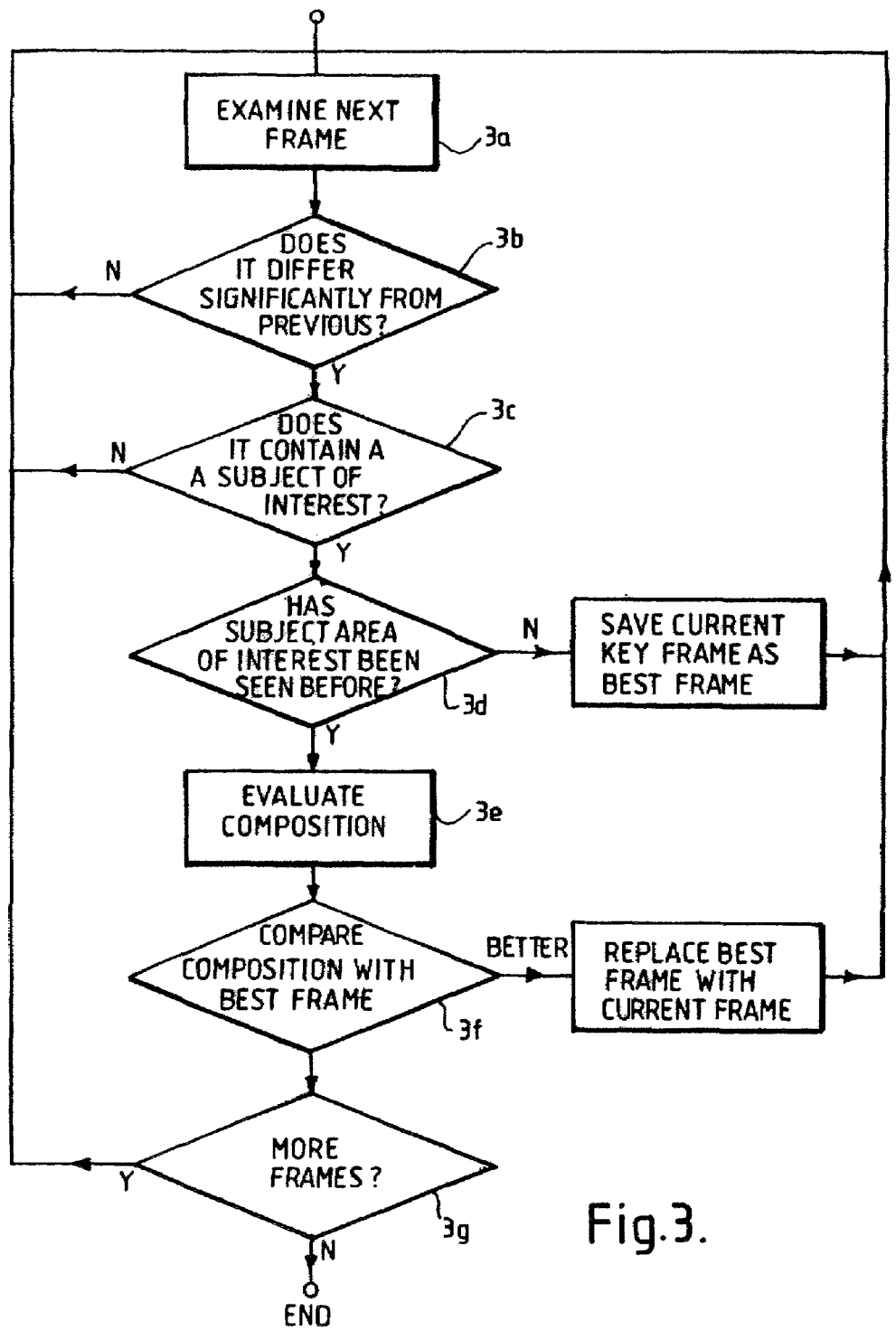
FIG. 3 is a flowchart showing the different stages of analysis and image updating of the captured frames.

The overall process by which the application program operates is illustrated by the flowchart of FIG. 3.

Initially, a key frame 15 is examined by the application program in step 3a. In step 3b, an analysis is performed to determine whether the key frame 15 differs significantly from the previously captured key frame. This is performed using the video frames 14, and the abovementioned tracking operation for the areas of interest within the video frames. Other techniques for achieving motion tracking are known in the art. If it is determined that there are no significant differences between the image content, then the next frame is analyzed and the process repeats at step 3a. If the analysis determines that there is significant difference, then in the next step (step 3c) the program determines whether there is an identifiable 'subject area of interest'. The subject area of interest will usually be the subject (e.g., a person) which the user is trying to capture, and will generally comprise one of the areas of interest. Many methods are possible for identifying such areas which are likely to be of particular interest. As an example, one technique is to identify foreground areas from background areas. One way of achieving this is to cluster the colors of particular regions to find a set of regions occupying a large proportion of the image, yet containing relatively few colors. Typically, such regions represent the sky or ground. Non-background regions can then be grouped into subject area(s) of interest, by locating groups of non-background regions which are separated from other such groups by background regions. These groupings can be refined by the use of motion tracking. If a particular grouping of foreground regions later splits into two groups, clearly two objects are involved and this knowledge can be used to revise the earlier analysis. A more refined approach to this aspect is to predispose the system to favor some subjects as more interesting than others. Typically, this will be done by enabling the system to recognize people of interest.

If no subject area is identified, then the process will go back to step 3a. If a subject area is identified, then the process goes to the next step, step 3d.

In step 3d, a comparison is made with previously stored key frames 15 relating to that subject area of interest. The easiest method of establishing whether a subject area of interest has been seen previously is by determining how its regions have been tracked from one frame to the next. This is suitable providing the object does not go out of view. If the object does go out of view and later reappears it is sometimes possible to detect this using one of the following methods, namely a) color matching followed by shape and feature matching, b) detecting identifier tags on the object, (for example, visible badges or infrared detected badges pinned to people of interest), or c) by tracking the motion of the camera 1, so that when the camera returns to a particular line of sight, views of static objects can be easily matched to previous views of the same objects. In this last method, motion sensors (e.g., gyros) are incorporated in the camera 1 such that the position of the camera is known. By keeping track of what the camera 1 has looked at previously, the application program will be able to determine whether or not a particular image has been seen before, i.e., by detecting that the camera is looking in the same direction as was previously the case.

To elaborate on b) mentioned above, the camera system can be configured to identify subject areas of interest by means of 'identifying' so-called identifier tags which have been placed on particular subjects. In this way, it is possible to predispose the camera to identify and capture particular classes, or types, of subject. For example, the user might wish to capture images which only include a particular member or members of his family. Thus, by tagging members of his family, e.g. using a pin badge, the camera will detect such tags and classify such identified regions as the subject areas of interest. The camera will not identify other areas of interest (e.g., simply because they exhibit a particular color or interesting movement pattern). Such a method of identifying a subject area of interest is particularly useful where 'interesting' subjects are mingling amongst similar 'uninteresting' subjects, say, in a theme park or zoo.

To take this a step further, different tags can be used for different classes of subject. Different tag types can indicate the user's preference to what is captured. The user might predispose the camera to capture a person of prime importance, for example, a person at their own party, while at the same time configuring the camera to capture members of that persons family when the person of prime importance is not in view. The family members would have to wear different tag types to those worn by the person of prime importance.

Of course, predisposing the camera system to identify tags not only requires the actual tag to be identified as a subject area of interest. The region 'attached' to that tag will, of course, form the overall subject and so detecting the regions around the tag will have to be performed, e.g., by identifying particular colors and/or textures and/or tracking the relative motion of those regions with respect to the tag.

If the subject area has not been seen before, e.g., because the user has quickly turned away from the subject and has pointed the camera 1 at a completely different scene, then the current key frame 15 is saved as the best frame for this particular 'group' of frames, and the process repeats from stage 3a again. If the subject area has been seen, e.g., the previous key frame was of the same subject area, but at a slightly different orientation, or because the camera 1 has been moved back to a previously captured scene, then the process moves on to step 3f. This step evaluates the composition quality of the subject area of interest and assigns a quality factor to the key frame 15 as a result. This process is described in more detail below.

Figure 4:
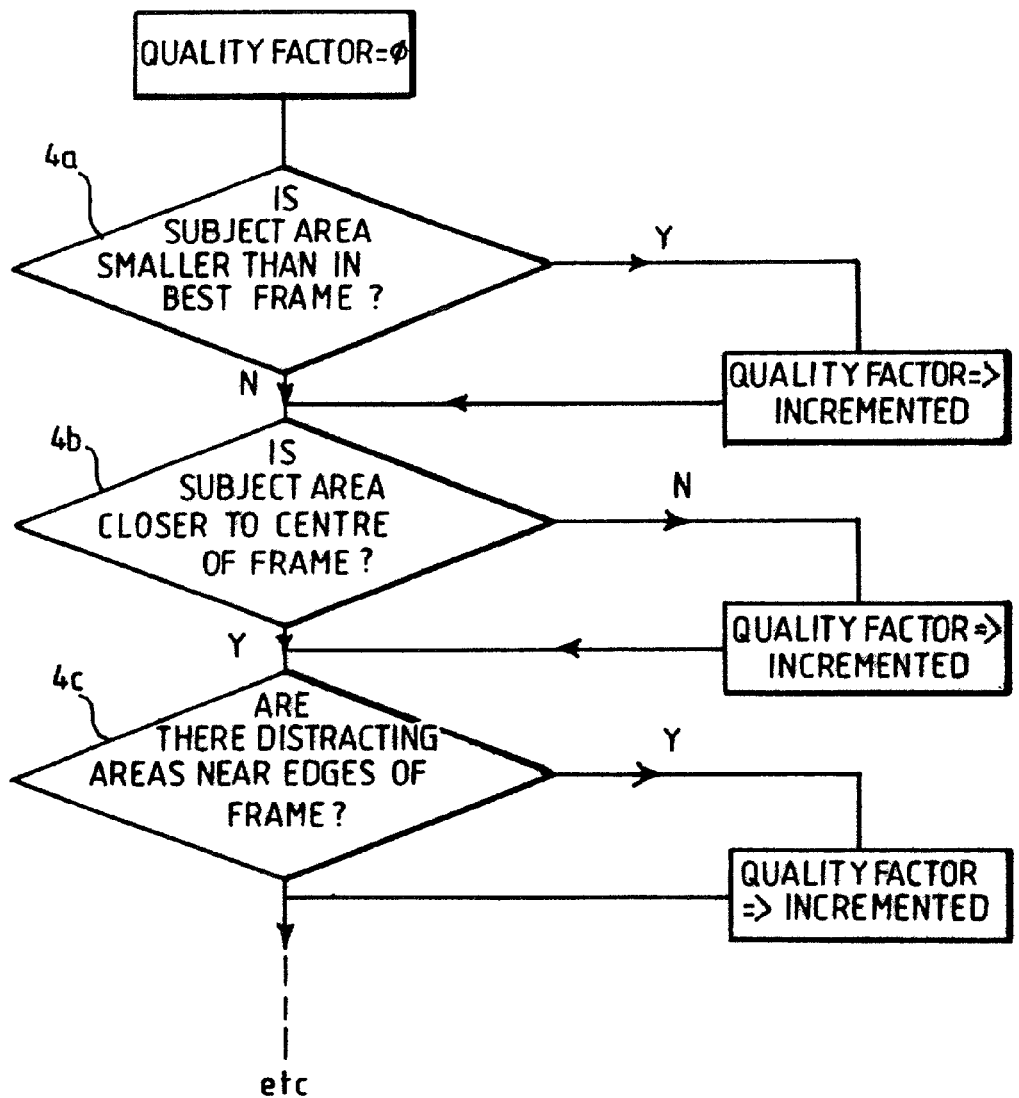
FIG. 4 is a flowchart showing the different stages of assigning a quality factor to a captured frame.

Referring to FIG. 4, which shows step 3f in detail, at the start of the composition quality evaluation stage, a composition quality index, or factor, is set to zero. Analysis of the subject area of interest thereafter follows to assess the quality of composition of that subject area with respect to the stored 'best frame' for this group. In a first test, at step 4a, the size of the subject area of interest is compared with the best frame. If it is larger than in the best frame, then the quality factor remains at zero. If it is smaller, then the quality factor is incremented. At step 4b, the image is analyzed to determine whether the subject area is closer to the center of the overall image compared with the best frame. If not, the quality factor is incremented. In step 4c, the image is further analyzed to determine whether there are distracting regions close to the edges of the frame. If so, the quality factor is incremented. These tests could prove particularly useful where the user is walking past a subject, keeping it roughly in the center of the camera view. As the user approaches and passes the object, it will appear larger, occluding objects will move out of the way, and then the object will appear smaller or become occluded again. These three tests should provide a lower numerical quality factor (indicating a higher composition quality) for the closest frame with the subject being closest to the center.

While only three analysis steps 4a–c, or tests, are shown, it will be appreciated that more could be included. For example, the quality factor could be increased if there are large regions of boring detail, or where the subject area is more obscured by some other region than in the previous best frame.

In the case where the key frames 15 include facial features, conventional image recognition techniques could be employed to identify this special subject area. The analysis tests could be customised to deal with faces. For example, since it is particularly preferred that faces not be obscured, this test might be included. Images where the face appears to be looking towards another face, or looking in the same direction as another face might also be preferred, these characteristics being relevant to photographic composition techniques. Taking this a step further, images where the face is known to the user might be preferred. By keeping a database of facial features, a comparison could be made with the subject area of the captured key frame 15. The fact that there are a greater number of faces looking into the camera's view might also be a preferred characteristic.

At the end of step 3f, the key frame in question will be assigned the resultant quality factor. The higher the number, the lower the quality of composure and vice-versa.

Referring back to FIG. 3, in step 3g, the assigned quality factor for the current key frame 15 is compared with that previously assigned to the best frame. If it is lower, then this indicates a higher composition quality, and so the best frame is deleted and replaced with the current key frame 15. The next key frame 15 is then analysed at step 3a, and so on, with the key frame previously analysed being considered the best frame for this next analysis. If the quality factor is higher, this indicates a poorer composition quality and so the current key frame 15 is discarded and the process repeats from step 3a.

In following the above described steps, the application program selectively and automatically stores only that key frame 15 (for each separate image group) which is considered the best composed version.

In this embodiment, the application program is executed in the PC 13. This means that the camera 1 is operated over the course of a session until the in-situ memory 9 becomes full, at which time the image data is downloaded for processing, the camera memory becomes erased, and a new session initiated. Alternatively, however, the software could be executed within the camera 1 itself so that the frame selection is performed whilst the continuous capture mode is in operation. Thus, the in-situ memory 9 of the camera will become full less frequently.

With the recent increase in use of 'non-viewfinder' cameras, such as those worn on a part of the body, the use of this method is particularly advantageous since the wearer will not have any perceivable idea of the composition which is being captured by the camera. The method will allow images having the best composition to be captured and stored.

As a further point, it will be appreciated that the system described above finds useful application in mounted-camera situations. For example, in theme parks, mounted cameras are commonly used to capture people on particular attractions, e.g., rollercoasters. However, such cameras do not capture images based on composition factors, but rather require some switching operation based on the position of the ride. The system described above does not require such switching, and can be used in any mounted environment to capture images where composition is important. Photographs involving groups of people can also be identified and sorted using the above-mentioned tagging procedure.

Finally, whilst the above-described embodiment utilises two camera systems 3, 5 (producing two groups of frames as shown in FIG. 2) it will be appreciated that the method is not limited to such an arrangement. Frames acquired at one capture rate and at the same resolution can be used, although where motion tracking is used to identify regions of interest in a frame, a high capture rate is preferable.

What is claimed is:

1. A method of selectively storing digital images in a memory, the memory being connected to a processor, the processor being connected to a digital image source, the method comprising:

storing, in the memory, a plurality of digital images received from the source, each image representing an event captured at a different respective time;

using the processor to perform an analysis of the images;

assigning a quality factor to each image, the quality factor being representative of the composition quality of the analysed images; and updating the memory to maintain images for which the assigned quality factor indicates a higher composition quality than an image captured at an earlier time, wherein:

the step of analysing the images comprises identifying at least one portion of the image, comparing the or each portion with an equivalent portion of a previously acquired image to identify images having similar appearance, the step of updating the memory being performed separately for images of a similar appearance;

in the step of analysing the images, the at least one portion of the image to be compared is established by means of (i) identifying at least one area of interest in the image, and (ii) tracking the motion of said at least one area of interest over subsequent images;

the step of analysing the images further comprises identifying at least one subject area of interest, and wherein, in the step of assigning a quality factor to each image, the quality factor is representative of the composition quality of said at least one subject area of interest; and the quality factor is determined according to the size of said at least one subject area of interest, the composition quality increasing with the size of said at least one subject area of interest.

2. A method according to claim 1, wherein first and second images are stored, the second image being captured after the first image, the step of updating the memory comprising deleting the first image if its assigned quality factor indicates a lower composition quality than that assigned to the second image.

3. A method according to claim 1 or claim 2, wherein the step of analysing the image content comprises identifying sets of images having similar appearance by means of comparing an image acquired at a time 11 with an image acquired prior to 11, the step of updating the memory being performed separately for each identified set of images having similar appearance.

4. A method according to claim 3, wherein the digital image source includes a position sensor for outputting a sensor signal indicating the spatial position of the digital image source, and wherein, in the step of identifying images having similar appearance, the sensor signal is used to determine whether the digital image source has previously captured an image of a similar view.

5. A method according to claim 1, wherein the step of identifying said at least one area of interest comprises segmenting the image into regions having generally consistent texture.

6. A method according to claim 1, wherein the step of identifying said at least one area of interest comprises segmenting the image into regions having generally consistent colour.

7. A method according to claim 1, wherein the step of identifying said at least one area of interest comprises segmenting the image into regions having generally consistent texture and colour.

8. A method according to claim 1, wherein, in the step of identifying said at least one subject area of interest, said at least one subject area of interest is identified as being located generally in the centre of the image.

9. A method according to claim 1, wherein, in the step of identifying said at least one subject area of interest, said at least one subject area of interest is identified according to identification tags situated on particular subjects.

10. A method according to claim 9, wherein different tag types are provided for different groups of subjects, said at least one subject area of interest being categorised according to the tag type identified.

11. A method according to claim 1, wherein, in the step of identifying said at least one subject area of interest, human facial features are identified as comprising said at least one subject area of interest.

12. A method according to claim 11, wherein the quality factor is determined according to the presence of said at least one area of interest obscuring said at least one identified facial subject area of interest, the composition quality decreasing according to the degree that said at least one facial subject area is obscured.

13. A method according to claim 11, wherein the quality factor is determined according to the orientation of said at least one identified facial subject area of interest, the composition quality increasing if there is at least one identified facial subject area where most of the face is visible in the image.

14. A method according to claim 11, wherein the quality factor is determined according to the orientation of said at least one identified facial subject area of interest, the composition quality increasing if there are two identified facial subject areas whose orientations face one another.

15. A method according to claim 11, wherein the quality factor is determined according to the orientation of said at least one identified facial subject area of interest, the composition quality increasing if there is at least one identified facial subject area where most of the face is visible in the image and there are two identified facial subject areas whose orientations face one another.

16. A method according to claim 11, wherein the quality factor is determined according to recognition of said at least one facial subject area of interest, the composition quality increasing if there is a facial subject area in the image which is identified as being present in a database of previously-stored facial features.

17. A method according to claim 1, wherein, in the step of storing images received from a source, the images are divided into first and second groups, the first group comprising images received at a first data rate and a first resolution and the second group comprising images received at a second data rate and a second resolution, the second data rate being greater than that of the first data rate, and the second resolution being less than that of the first resolution, and wherein, in the step of analysing the images, the or each portion of the image to be compared is established by means of tracking the motion of the said at least one area of interest using images of the second group, the resulting quality factor being assigned to a preceding image of the first group.

18. A method of selectively storing digital images in a memory, the memory being connected to a processor, the processor being connected to a digital image source, the method comprising:
  storing, in the memory, a plurality of digital images received from the source, each image representing an event captured at a different respective time;
  using the processor to perform an analysis of the images;
  assigning a quality factor to each image, the quality factor being representative of the composition quality of the analysed images; and
  updating the memory to maintain images for which the assigned quality factor indicates a higher composition quality than an image captured at an earlier time, wherein:
  the step of analysing the images comprises identifying at least one portion of the image, comparing the or each portion with an equivalent portion of a previously acquired image to identify images having similar appearance, the step of updating the memory being performed separately for images of a similar appearance;
  in the step of analysing the images, the at least one portion of the image to be compared is established by means of (i) identifying at least one area of interest in the image, and (ii) tracking the motion of said at least one area of interest over subsequent images;
  the step of analysing the images further comprises identifying at least one subject area of interest, and wherein, in the step of assigning a quality factor to each image, the quality factor is representative of the composition quality of said at least one subject area of interest; and
  the quality factor is determined according to the spatial separation of said at least one subject area of interest with respect to other parts of the image having a high relative motion, the composition quality increasing with the amount of spatial separation.

19. A method of selectively storing digital images in a memory, the memory being connected to a processor, the processor being connected to a digital image source, the method comprising:
  storing, in the memory, a plurality of digital images received from the source, each image representing an event captured at a different respective time;
  using the processor to perform an analysis of the images;
  assigning a quality factor to each image, the quality factor being representative of the composition quality of the analysed images; and
  updating the memory to maintain images for which the assigned quality factor indicates a higher composition quality than an image captured at an earlier time, wherein:
  the step of analysing the images comprises identifying at least one portion of the image, comparing the or each portion with an equivalent portion of a previously acquired image to identify images having similar appearance, the step of updating the memory being performed separately for images of a similar appearance;
  in the step of analysing the images, the at least one portion of the image to be compared is established by means of (i) identifying at least one area of interest in the image, and (ii) tracking the motion of said at least one area of interest over subsequent images;
  the step of analysing the images further comprises identifying at least one subject area of interest, and wherein, in the step of assigning a quality factor to each image, the quality factor is representative of the composition quality of said at least one subject area of interest; and
  the quality factor is determined according to the presence of said at least one area of interest at the edges of the image, the composition quality decreasing in the presence of said at least one area of interest at the image edges.

20. A computer program stored on a computer usable medium, the computer program comprising computer readable instructions for causing a computer to execute steps in a method of selectively storing digital images in a memory, the memory being connected to a processor which is connected to a digital image source, the method comprising the steps of:
  storing, in the memory, a plurality of digital images received from the source, each image representing an event captured at a different respective time;
  using the processor to perform an analysis of the image content;
  assigning a quality factor to each image, the quality factor being representative of the composition quality of the analysed images; and
  updating the memory to maintain images for which the assigned quality factor indicates a higher composition quality than an image captured at an earlier time, wherein:
  the step of analysing the images comprises identifying at least one portion of the image, comparing the or each portion with an equivalent portion of a previously acquired image to identify images having similar appearance, the step of updating the memory being performed separately for images of a similar appearance;
  in the step of analysing the images, the at least one portion of the image to be compared is established by means of (i) identifying at least one area of interest in the image, and (ii) tracking the motion of said at least one area of interest over subsequent images;
  the step of analysing the images further comprises identifying at least one subject area of interest, and wherein, in the step of assigning a quality factor to each image, the quality factor is representative of the composition quality of said at least one subject area of interest; and
  the quality factor is determined according to the size of said at least one subject area of interest, the composition quality increasing with the size of said at least one subject area of interest.

21. A system for selectively storing digital images, the system comprising: a processor connected to a digital image source by means of a video input port; and a memory connected to the processor, wherein the processor is arranged to store, in the memory, a plurality of digital images received from the source by means of the video input port, each image representing an event captured at a different respective time, the processor being arranged to perform an analysis of the images; to identify at least one area of interest within each image and comparing the at least one area of interest with at least one area of interest within previously acquired images; to further identify at least one subject area of interest from the at least one area of interest; and to assign a quality factor to each image, the quality factor being representative of the composition quality of the analysed images, the assigned quality factor being representative of the composition quality of the or each subject area of interest and the quality factor is determined according to a size of said at least one subject area of interest, the composition quality increasing with the size of said at least one subject area of interest, the processor being further arranged to update the memory to maintain images for which the assigned quality factor indicates a higher composition quality than an image captured at an earlier time.

22. A method of selectively storing digital images in a memory, the memory being connected to a processor, the processor being connected to a digital image source, the method comprising:

storing, in the memory, a plurality of digital images received from the source, each image representing an event captured at a different respective time;

using the processor to perform an analysis of the images, the analysis including the step of identifying at least one set of images, such that the images in each of the at least one sets have similar appearance, by means of identifying at least one area of interest within each image and comparing the at least one area of interest with at least one area of interest within previously acquired images;

assigning a quality factor to each image in each of the at least one sets, the quality factor being representative of the composition quality of the analysed image content, wherein the step of analysing the image content further comprises identifying at least one subject area of interest from the at least one area of interest, the assigned quality factor being representative of the composition quality of the or each subject area of interest and the quality factor is determined according to the size of said at least one subject area of interest, the composition quality increasing with the size of said at least one subject area of interest; and updating the memory to maintain, for each set of images having similar appearance, images for assigned quality factor indicates a higher composition quality than an image, in that respective image set, captured at an earlier time.

23. A method according to claim 22, wherein, in the step of identifying the at least one subject area of interest, the at least one subject area of interest is identified as being generally located in the centre of the image.

24. A method according to claim 22, wherein, in the step of identifying the at least one subject area of interest, the at least one subject area of interest are identified according to identification tags situated on particular subjects.

25. A method according to claim 22, wherein, in the step of identifying the at least one subject area of interest, human facial features are identified as comprising the at least one subject area of interest.

26. A method of selectively storing digital images in a memory, the memory being connected to a processor, the processor being connected to a digital image source, the method comprising:

storing, in the memory, key-frame images received from the image source at a first data rate and first resolution, and, interleaved between the key-frame images, video images received from the image source at a second data rate and second resolution, the second data rate being greater than that of the first data rate and the second resolution being less than that of the first resolution, each key-frame image and video image representing an event captured at a different respective time;

using the processor to perform an analysis of the images, the analysis including the step of identifying at least one set of images, the images in the or each set have similar appearance, the step being performed by means of (a) identifying at least one area of interest within each key-frame image, (b) tracking the motion of the at least one area of interest using the video images following each key-frame image, and (c) comparing the at least one area of interest with the at least one area of interest within previously acquired images;

assigning a quality factor to each key-frame image in each of the at least one sets, the quality factor being representative of the composition quality of the analysed key-frame images, wherein the quality factor is determined according to a size of at least one subject area of interest identified from said at least one area of interest, the composition quality increasing with the size of said at least one subject area of interest; and updating the memory to maintain, for each set of images having similar appearance, key-frame images for which the assigned quality factor indicates a higher composition quality than an key-frame image, in each respective set, captured at an earlier time.

* * * * *